Patented Apr. 1, 1952

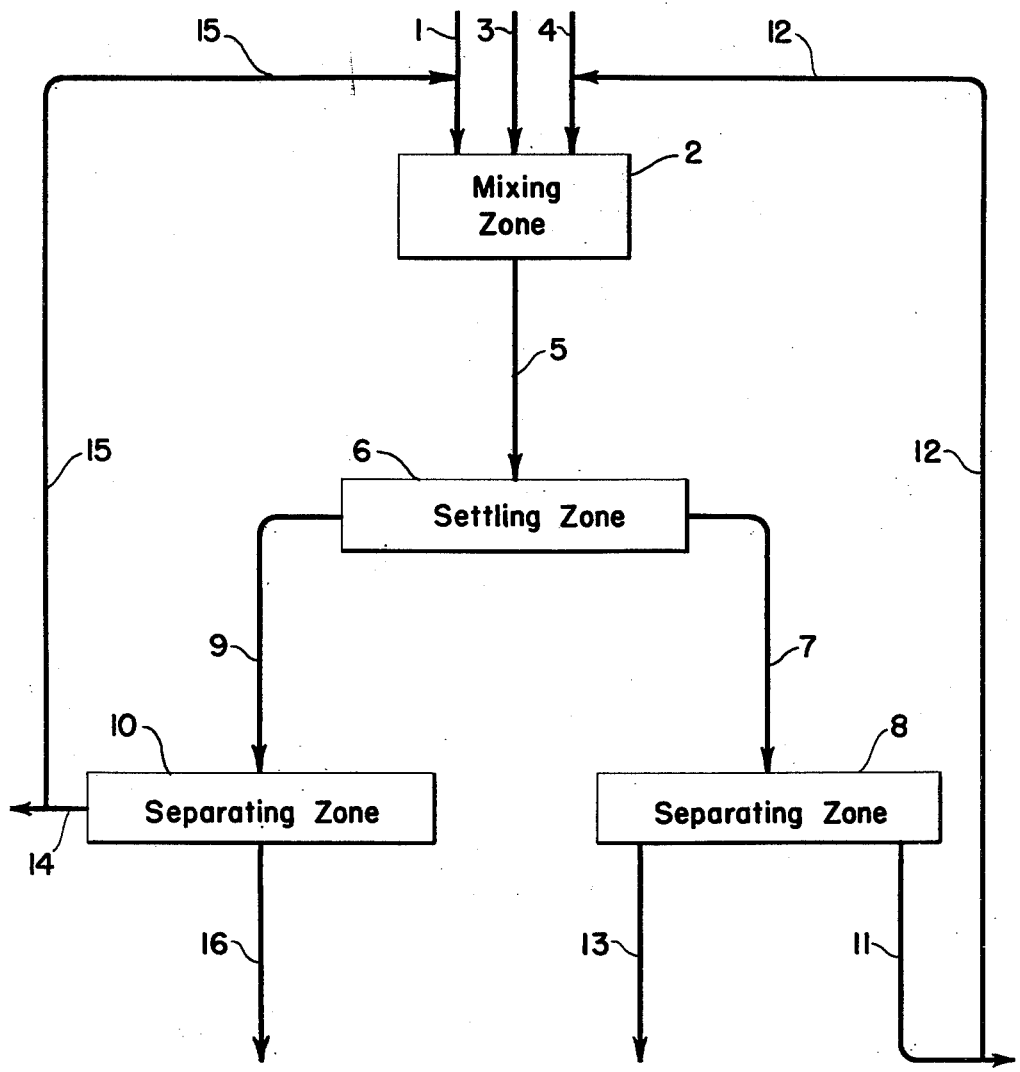

2,590,923

UNITED STATES PATENT OFFICE 2,590,923

PRODUCTION OF DRYING OILS

Herman S. Bloch, Chicago, and Richard C. Wackher, La Grange, Ill., assignors to Universal Oil Products Company, Chicago, Ill., a corporation of Delaware Application August 17, 1948, Serial No. 44,665

16 Claims. (Cl. 260—666)

This invention relates to a process for producing drying oils by reacting an olefinic hydrocarbon having at least three carbon atoms per molecule with an unsaturated organic polar compound. More particularly, the invention is concerned with the production of a high boiling unsaturated liquid product by condensation, polymerization, and hydrogen transfer reactions between an olefinic hydrocarbon having at least three carbon atoms per molecule and an unsaturated organic polar compound in the presence of hydrofluoric acid catalyst.

An object of this invention is the manufacture of an unsaturated organic material having more than one double bond per molecule and useful in the production of drying oils, resins, and the like.

Another object of this invention is the production of a substantially paraffinic hydrocarbon product and a high-boiling unsaturated liquid organic material useful as a drying oil.

One specific embodiment of this invention relates to a process for producing a drying oil which comprises reacting an olefinic hydrocarbon having at least three carbon atoms per molecule with an unsaturated organic polar compound in the presence of a conjunct polymerization catalyst until a reaction mixture comprising substantially saturated hydrocarbons and polyunsaturated organic compounds is formed, separating the reaction mixture into a conjunct polymerization catalyst phase and a hydrocarbon phase, separating a substantially saturated hydrocarbon product from the hydrocarbon phase, and recovering from the conjunct polymerization catalyst phase a drying oil having more carbon atoms per molecule than the olefinic hydrocarbon charged.

Another embodiment of this invention relates to a process for producing a drying oil which comprises reacting an aliphatic olefinic hydrocarbon having at least three carbon atoms per molecule with an unsaturated organic polar compound in the presence of a hydrofluoric acid catalyst containing a major proportion by weight of hydrogen fluoride until a reaction mixture comprising saturated hydrocarbons and polyunsaturated organic compounds is formed, separating the reaction mixture into a hydrofluoric acid phase and a hydrocarbon phase, separating a saturated hydrocarbon product from the hydrocarbon phase, and recovering from the acid phase a drying oil having more carbon atoms per molecule than the olefinic hydrocarbon charged.

Monoolefinic hydrocarbons utilizable in the process have at least three carbon atoms per molecule and comprise propylene, the butylenes, pentenes, hexenes, heptenes, octenes, and higher boiling monoolefinic hydrocarbons. A preferred source of such monoolefinic hydrocarbons is polymer gasoline which is formed, for example, by polymerizing propylene and butylenes or mixtures thereof in the presence of solid phosphoric acid catalyst which is a calcined composite of a phosphoric acid and a siliceous carrier such as diatomaceous earth, also called kieselguhr. Fractions of cracked gasoline containing substantial amounts of olefins and relatively small proportions of aromatic hydrocarbons are also suitable charging stocks. These gasoline charging stocks may also contain certain amounts of paraffinic and naphthenic hydrocarbons some of which may be alkylated during the polymerization treatment. $C_3$ and $C_4$ fractions recovered from the products of cracking and a $C_4$ fraction recovered from butane dehydrogenation and containing mainly butylenes and normal butane with relatively little isobutane are also good charging stocks for this purpose.

This specific invention relates to the conjunct copolymerization of olefinic hydrocarbons with unsaturated organic polar compounds having the general formula R—Ar—Q wherein Ar represents an aromatic hydrocarbon radical including phenyl, naphthyl and the like, R represents an alkenyl group and Q represents a member of the group consisting of a hydrogen atom, an alkyl group, an alkenyl group, and a halogen atom, as well as a carboxylic acid group and a sulfonic acid group.

These unsaturated organic polar compounds comprise unsaturated aromatic hydrocarbons and their derivatives wherein the aryl group or the substituted aryl group provides polarity to the molecule. Examples of these compounds are styrene, divinylbenzene, inden, alpha-methylstyrene, p-methyl-alpha-methylstyrene, chlorinated styrenes, vinylbenzoic acids, vinyl-benzenesulfonic acids, vinylnaphthalenes, as well as analagous compounds in which the ethylenic side chain is not conjugated with the aromatic nucleus as in the case of the corresponding allyl or crotyl compounds.

The unsaturated organic polar compounds usable in this process may also include heterocyclic compounds such as, for example, vinylpyridines, coumarones, and the like.

Drying oils of especially desirable characteristics are prepared by this process from a mixture of monoolefin hydrocarbons, such as polymer gasoline, and an unsaturated organic polar compound, such as styrene, inden, divinylbenzene and the like. The drying oils so formed from these starting materials contain substantial amounts of co-polymers of the monoolefinic hydrocarbon with the unsaturated organic polar compound as aforementioned. The co-polymer drying oils may be modified further by incorporating in the reaction mixture certain dienic hydrocarbons such as butadiene-1,3, isoprene, cyclopentadiene, and the like or an acetylenic hydrocarbon.

Hydrogen fluoride catalysts employed in this condensation and polymerization process and also referred to as hydrofluoric acid contain a major proportion by weight of hydrogen fluoride and generally may contain as much as 10% by weight of water, although the titratable acidity of the catalyst layer may be less than 90% because of the presence therein of dissolved organic compounds including highly unsaturated materials which are described more completely hereinafter. The catalyst preferred in this process is substantially anhydrous hydrogen fluoride, that is, 100% hydrogen fluoride, or the hydrogen fluoride of commerce, of 98+% purity.

Other conjunct polymerization catalysts utilizable in the production of drying oils from a sludge containing the same and produced under reaction conditions similar to those employed for the formation of a sludge from a hydrogen fluoride catalyst, include in general, certain acid-acting halides such as aluminum bromide and aluminum chloride, in their substantially anhydrous forms and used catalyst sludges containing these aluminum halides, sulfuric acid of at least about 85% concentration, boron trifluoride, and mixtures of boron trifluoride and hydrogen fluoride. These other catalysts may be used to form conjunct polymerization products which are structurally and physically somewhat similar to the conjunct polymers, formed when hydrogen fluoride is utilized as the catalyst herein, but differ chiefly in the manner of recovering the conjunct polymers from sludges containing said catalysts. Because hydrogen fluoride sludges may be decomposed under such conditions that the catalyst may be recovered in a substantially anhydrous condition, suitable for recycling to the sludge forming stage, it is generally preferred in the present process.

The operating temperature used in this process has a profound influence upon the nature of the reaction or reactions occurring when an unsaturated organic polar compound as herein defined is reacted with an olefinic hydrocarbon having at least three carbon atoms per molecule in the presence of hydrofluoric acid catalyst. Part of this effect of temperature may be due to the behavior of the olefinic hydrocarbons themselves in the presence of hydrogen fluoride. Thus while ethylene reacts with hydrogen fluoride to form mainly ethyl fluoride and also certain amounts of polymers at temperatures from about 0° to about 175° C., propylene gives some isopropyl fluoride at the lower operating temperatures but good yields of conjunct polymers at the higher temperatures of treatment within the mentioned range of 0° to about 175° C.

In contrast to the behavior of ethylene which produces ethyl fluoride as a major product, the monoolefins having at least three carbon atoms per molecule undergo extensive polymerization and condensation with unsaturated organic polar compounds in the presence of hydrofluoric acid catalyst and with only a small amount of alkyl fluoride formation at temperatures of from about 0° to about 175° C. and preferably at temperatures of from about 25° to about 125° C. Also the condensation and polymerization of these olefinic hydrocarbons and unsaturated organic polar compounds involves more than the simple combination of olefinic molecules to form dimers, trimers, tetramers, and higher polymers.

It has been observed and these observations have been made the basis of the present process that when a mixture of an olefinic hydrocarbon and an unsaturated polar compound is subjected to conjunct co-polymerization in the presence of a conjunct polymerization catalyst heretofore specified, conjunct polymer product is formed in significantly greater yield than in the case of the conjunct polymerization of the monoolefinic only. The modified chemical structure of the product (by virtue of the presence of unsaturated organic polar compounds) markedly affects the drying properties of the material, the modified product forming an air-dried film of excellent adherence which dries to a non-tacky film possessing the desired properties of such films for drying oil purposes. Further, the presence of unsaturated organic polar compounds in the charging stock tends to increase the yield of conjunct polymers obtained from a given weight of charging stock and conjunct polymerization catalyst. The latter effect is believed to be due to the increased number of hydrogen acceptors charged to the process.

The complex series of reactions herein referred to in the aggregate as a "conjunct polymerization reaction" comprises an initial polymerization and condensation reaction between the olefinic hydrocarbons and unsaturated organic polar compounds which are components of the charging stock and as the reaction progresses further, cyclization and isomerization of the polymers and condensation products occur, accompanied by a hydrogen transfer reaction whereby a portion of the conjunct polymers is converted into saturated hydrocarbons by virtue of the hydrogen transfer at the expense of other components which are converted into highly unsaturated organic compounds containing on an average of from about 2 to about 5 double bonds per molecule of which from about 30 to about 70% are conjugated. The resulting unsaturated conjunct polymers comprising a series of high molecular weight polyolefinic cyclic compounds become attached by weak chemical bonds to the catalyst to form a sludge-like complex addition product in which the fluorine (in the case of a hydrogen fluoride catalyst) is not, however, organically bound, since it can be substantially all recovered by treatment of the complex with water or cold aqueous alkali. The saturated hydrocarbon conjunct polymers form an insoluble phase which upon settling of the reaction mixture separates as a distinct upper layer hereinabove referred to. Since the formation of the unsaturated conjunct polymer is dependent upon the presence of hydrogen acceptors in the reaction mixture, it also follows that the proportions of hydrogen acceptors to hydrogen donors influences the total unsaturation of the polyolefinic conjunct polymers formed, as well as their yield from given weights of olefinic hydrocarbons and unsaturated organic polar compounds charged. The knowledge of the relationship between unsaturation of the hydrocarbon charging stock and the unsaturation of the ultimate hydrocarbon drying oil product is embodied in the utilization of an admixture of unsaturated organic polar compounds and monoolefin hydrocarbons as charging stocks in the present process to obtain conjunct co-polymerization therebetween and to form a greater yield of conjunct polymers having somewhat different chemical structure than a product similarly prepared by conjunct polymerization of a monoolefin hydrocarbon only. The modified structures of the conjunct polymers obtained in accordance with the process herein described are believed to be the basic factors involved in the formation of the more adherent, more elastic and tougher films formed on drying of the films when exposed to atmospheric oxygen.

Study of the ultra-violet and infra-red absorption spectra and other properties of drying oil fractions formed from polymer gasoline and boiling from about 150° to about 200° C., shows that many of these drying oil hydrocarbons contain a pair of conjugated double bonds with one of these double bonds in a ring of five carbon atoms and the other double bond in an alkenyl side chain. Thus a cyclopentene ring may be combined with a methylene group or a vinyl group. However, some of the drying oil hydrocarbons may also contain a cyclopentadiene ring. The drying oil hydrocarbons which contain a cyclopentenyl ring also contain more than two substituent groups but each of these groups is highly substituted. The higher boiling fractions of this drying oil boiling up to about 450° C. contain non-aromatic polycyclic hydrocarbons which are generally bicyclic. In both the monocyclic and polycyclic hydrocarbons the five-carbon atom ring portions of the molecules are combined with at least two alkyl groups or two unsaturated aliphatic groups. The data obtained on these fractions indicate that one of the double bonds comprised by the conjugated diene systems of the drying oil is within a five-carbon atom ring and the other double bond is in an alkenyl or alkapolyenyl substituent. Alkapolyenyl groups that may be present are highly branched and contain isolated unsaturation as well as conjugated unsaturation. Some of the typical hydrocarbons contained in the drying oil mixtures so produced from polymer gasoline are represented structurally by the following formula:

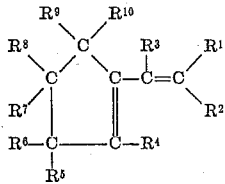

wherein the radicals $R^1$ to $R^{10}$ are selected from the group consisting of hydrogen and alkyl, alkenyl, and alkapolyenyl hydrocarbon radicals, at least two of the substituents $R^4$ to $R^{10}$ are hydrocarbon radicals, and not more than two of the groups $R^1$ to $R^4$ represent hydrogen.

Other constituents of the drying oil formed from polymer gasoline are believed to have structures that may be represented by the formula:

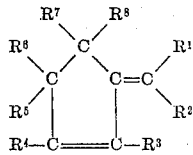

wherein $R^1$ to $R^8$ represent members of the group consisting of hydrogen and alkyl, alkenyl, and alkapolyenyl hydrocarbon radicals, at least two of the substituents $R^3$ to $R^8$ are hydrocarbon radicals, and not more than two of the substituents $R^1$ to $R^4$ are hydrogen.

The drying oils of the present process containing unsaturated organic polar compounds have some of the aforementioned five-carbon atom ring structures condensed with one or more molecular proportions of unsaturated organic polar compounds.

Condensation products are also formed from the olefinic hydrocarbons and unsaturated organic polar compounds and their derivatives, which are of higher molecular weight and degree of molar unsaturation than the olefinic hydrocarbon charging stock and also have good drying oil properties. Such drying oils may be regarded as containing mixtures of condensation products and of high boiling polymers having a high degree of conjugated and non-conjugated unsaturation. Such drying oils have the advantage that many of them form protective films that are less brittle and more durable than those films formed from high boiling unsaturated oils produced similarly from aliphatic olefinic hydrocarbons alone without the addition of unsaturated organic polar compounds.

This condensation or conjunct co-polymerization process for producing drying oils may be modified further by incorporating in the reaction mixture a certain amount of a more unsaturated olefinic hydrocarbon, namely, a dienic hydrocarbon, as for example, butadiene-1,3, isoprene, cyclopentadiene, and the like, or an acetylenic hydrocarbon.

The present process consists essentially, in its preferred form, of contacting an olefinic hydrocarbon and an unsaturated organic polar compound or its derivative with substantially anhydrous hydrogen fluoride at conjunct polymerization conditions, separating the upper saturated hydrocarbon layer from the lower sludge layer, and then decomposing the sludge by water hydrolysis, by heating or by another suitable method, to recover the drying oil therefrom.

Improvement in adhesive properties of the drying oil product is observed when there is present about two mole per cent of the unsaturated organic polar compound. When more than about an equal molecular proportion of the unsaturated organic polar compound is present, the amount of condensation and speed of the condensation process is retarded. Accordingly, the molar ratio of aliphatic olefinic hydrocarbon to unsaturated organic polar compound will depend upon the properties desired in the product but may vary from about 1 to about 50. It should be pointed out, however, that valuable materials useful in the preparation of drying oils, resins, and other chemical products may be formed by the conjunct polymerization of unsaturated organic polar compounds in the absence of aliphatic olefinic hydrocarbons.

The weight ratio of hydrogen fluoride catalyst to organic charging stock, that is, the combined mixture of aliphatic olefinic hydrocarbon and unsaturated organic polar compound will vary from about 0.1 to about 10. When the hydrogen fluoride to total organic compound weight ratio is less than about 0.1, it is necessary to recycle excessive amounts of organic compounds in order to obtain good conversion while increases in this ratio above about 10 effect very little further increase in yield of the desired reaction products but such increased ratio of hydrogen fluoride to total organic reactants does decrease the capacity of the reactor and other treating equipment.

The present process is carried out at a temperature of from about 0° to about 175° C. and at a pressure sufficient to maintain the reactants and catalyst in substantially liquid phase. The operating pressure is generally from about 1 to about 100 atmospheres. At these reaction conditions, a vigorously agitated mixture of hydrogen fluoride, unsaturated organic polar compound and olefinic hydrocarbon containing at least three carbon atoms per molecule yields a high proportion of catalyst layer containing polyunsaturated organic compounds during a time of from about 1 to about 30 minutes, but the reaction may be continued for a longer time to obtain a better yield of the polyunsaturated organic compounds as evidenced by the more highly saturated character of the hydrocarbon mixture which is separated as an upper layer from the hydrogen fluoride layer.

Olefinic hydrocarbons having more than three carbon atoms per molucule are more desirable as charging stocks than propylene because of the increased yield of both saturated and unsaturated liquid products and improved properties of the products obtained from these preferred charging stocks. About the same quantity and quality of drying oil are obtained when charging any of the olefins having from 4 to about 12 carbon atoms per molecule. The different monoolefins having at least 4 carbon atoms per molecule appear to be mutually interconvertible by polymerization and de-polymerization reactions at the conditions specified for this process.

It is of interest to note that in this type of copolymerization, in which hydrogen transfer occurs, the product recovered from the sludge or catalyst layer has a higher molecular weight than that of the charge stock, and is generally more unsaturated than the charge stock.

It should be further noted that the introduction into the polyenic conjunct polymer of aromatic groups containing functional groups as substituents permits further modification of the product. For example, acidic substituent groups may be esterified with alcohols or converted to amides by reaction with amines, and the modifying reactants may be mono-functional or polyfunctional, saturated or unsaturated. It is evident that a wide variety of products having a large range of properties may be prepared in this manner.

In carrying out this process an olefinic hydrocarbon having at least three carbon atoms per molecule, an unsaturated organic polar compound and liquid hydrofluoric acid catalyst are added to a suitable reactor provided with adequate means of agitating the reactor contents and for controlling the temperature therein. Since the condensation, polymerization, and copolymerization reactions of this process are exothermic, it is generally necessary to cool the reactor in order to maintain the chosen reaction temperature. The olefinic hydrocarbon, unsaturated organic polar compound, and hydrogen fluoride catalyst are generally mixed at such rates that substantially all of the organic compounds charged are converted into the saturated hydrocarbon layer and the higher boiling highly unsaturated organic materials contained in the hydrofluoric acid layer. After the desired quantities of organic materials comprising essentially olefinic hydrocarbons and unsaturated organic polar compounds have been added to the hydrofluoric acid, or after the hydrofluoric acid has been added to the organic materials, the agitation or stirring of the reaction mixture is continued for a time sufficient to ensure substantially complete conversion of the reactants into saturated hydrocarbons and also highly unsaturated organic liquids having drying oil properties. The agitation or mixing is then stopped and the reaction mixture is permitted to stand whereby it forms two layers; an upper substantially saturated hydrocarbon layer and a lower hydrogen fluoride layer. The substantially saturated hydrocarbon layer is separated from the lower hydrogen fluoride layer comprising essentially hydrogen fluoride and highly unsaturated organic material with drying oil properties.

As the saturated hydrocarbons of the upper layer boil over about the same range of temperature as do the unsaturated drying oil constituents recoverable from the hydrogen fluoride lower layer and as small amounts of the saturated hydrocarbons are entrained or mixed with the hydrogen fluoride lower layer, it is advisable to extract the hydrogen fluoride lower layer with a low boiling saturated hydrocarbon, preferably a paraffin having from 3 to about 8 carbon atoms per molecule, before hydrolyzing, or otherwise decomposing, the hydrogen fluoride lower layer to recover the unsaturated drying oil therefrom. From the lower layer, the hydrogen fluoride and drying oil fractions are then separated by suitable means, for example, the lower layer may be added to water or ice whereby the hydrogen fluoride is dissolved in water to form an aqueous solution from which the drying oil separates as an upper layer. Also the lower layer may be subjected to flash distillation to vaporize the hydrogen fluoride from the higher boiling highly unsaturated drying oil. When the lower layer is separated by distillation methods, the recovered hydrogen fluoride is suitable for recycling to the process to effect reactions of additional quantities of charged monoolefinic hydrocarbon and unsaturated organic polar compounds of the type previously described.

Passage of inert gas, such as nitrogen, hydrogen, methane, ethane, carbon dioxide, and the like through the distillation system in which the hydrogen fluoride is being separated, assists in the recovery of the highly unsaturated drying oil. Separation of hydrogen fluoride from the drying oil present in the lower layer is also assisted by carrying out the flash distillation of said lower layer in a tower containing catalytic packing material formed from graphitized carbon or from a metal selected from the members of the group consisting of aluminum, copper, cobalt, lead, cadmium, and an alloy of copper, such as brass, and preferably in the presence of an inert carrier gas to assist in removing the liberated hydrogen fluoride.

Another method of decomposing the hydrogen fluoride-drying oil mixture of the lower layer formed by the reaction of hydrogen fluoride with a mixture of olefins and unsaturated organic polar compounds, is to introduce the lower layer or sludge into an inert liquid, such as a paraffinic hydrocarbon, contained in a decomposition zone and maintained at a temperature near its boiling point. The decomposition zone or reactor tower may contain a catalytic packing material in the liquid zone of this reactor tower and an inert gas may also be passed therethrough. Hydrogen fluoride so liberated is vaporized, condensed, and conducted to storage while the inert liquid containing the dissolved, highly unsaturated drying oil is withdrawn from the decomposition zone, either intermittently or continuously, and replaced by fresh liquid. This liquid should be readily separable from the drying oil dissolved therein and it should also be relatively inert to the hydrogen fluoride sludge and to the products of the decomposition of the sludge. If a paraffinic naphtha is employed, its normal boiling point should be from about 100° to about 150° C., so that it may be separated by fractional distillation from the drying oil which boils generally from about 150° to about 450° C.

One method of carrying out the process of this invention is illustrated diagrammatically by the figure which is a flow diagram indicating the various steps of the process. According to the method illustrated, an olefin-containing feed stock, such as a butane-butylene, a pentane-pentene mixture, cracked gasoline, polymer gasoline, and the like, is directed through line 1 to mixing zone 2 to which an unsaturated organic polar compound is directed through line 3 and hydrofluoric acid of 90 to 100% hydrogen fluoride concentration is introduced through line 4. Mixing zone 2 comprises a coil, an agitated reaction zone or other mixing equipment preferably provided with suitable temperature control means, such as, for example, a cooling or heating jacket or a cooling or heating coil in order to maintain the reaction mixture at a chosen temperature within the limits of from about 0° to about 175° C. The reaction mixture present in mixing zone 2 may also contain recovered hydrogen fluoride and a low boiling saturated hydrocarbon which are separated from the final reaction products and recycled through lines 12 and 15 respectively, to lines 4 and 1 as hereinafter described. The olefin-containing feed stock, unsaturated organic polar compound and hydrogen fluoride are contacted in mixing zone 2 for a time sufficient to convert substantially all of the olefin monomer and unsaturated organic compounds into condensation products and polymers and also to effect hydrogen transfer reactions between various polymers and condensation products so as to produce a substantially saturated hydrocarbon product and a highly unsaturated product, the latter being associated with the liquid hydrogen fluoride in the form of a complex. From mixing zone 2, the resultant mixture is directed through line 5 to settling zone 6 wherein the mixture or emulsion of organic polar compounds and liquid hydrogen fluoride is permitted to stand and separate into an upper hydrocarbon layer and a lower hydrofluoric acid catalyst layer. From settling zone 6, the hydrofluoric acid catalyst layer is withdrawn through line 7 to catalyst layer separating zone 8 while a substantially saturated hydrocarbon material which separates as an upper layer in zone 6 is directed therefrom through line 9 to hydrocarbon layer separating zone 10.

The hydrogen fluoride catalyst layer in separating zone 8 is subjected to flash distillation to separate hydrogen fluoride from highly unsaturated organic material, comprising drying oil materials. The used hydrogen fluoride so separated in zone 8 is directed therefrom through line 11 and at least a portion thereof is directed through recycle line 12 to line 4, and thence to mixing zone 2 already mentioned, while the highly unsaturated liquid drying oil material is discharged from separation zone 8 through line 13 to storage or to further purification or fractionation not illustrated in the figure.

The hydrocarbon layer so separated from used hydrogen fluoride catalyst in settling zone 6 is subjected to suitable fractionation in hydrocarbon separating zone 10. Fractional distillation of the hydrocarbonaceous material present in zone 10 separates therefrom as an overhead fraction a mixture of residual dissolved hydrogen fluoride and substantially saturated low boiling hydrocarbons introduced to the process in the olefin-containing charging stock or formed during the conversion reaction. Thus when charging a butane-butylene fraction, the hydrocarbon stream being directed from separating zone 10 through line 14 is mainly normal butane while this stream is mainly normal pentane when a pentane-pentene mixture is charged to mixing zone 2. If desired, a portion of the low boiling saturated hydrocarbon fraction which is discharged through line 14 may be directed therefrom through recycle line 15 to line 1, already mentioned, through which the olefin-containing feed stock is directed to the process. After removal of the low boiling saturated hydrocarbons in hydrocarbon separating zone 10, a substantially saturated hydrocarbon product formed by the condensation, polymerization and hydrogen transfer reactions is directed from zone 10 through line 16 to storage or to use not illustrated in the diagrammatic drawing.

When the olefinic charging stock does not contain a substantial proportion of saturated hydrocarbons having from 3 to about 8 carbon atoms per molecule, it is advisable to extract the hydrofluoric acid layer with such a solvent before separating the drying oil from the hydrofluoric acid layer in separating zone 8.

The following examples are given to illustrate the process of this invention although the data introduced should not be construed to limit unduly the broad scope of the invention.

*Example I*

23 grams of styrene, 185 grams of polymer gasoline, (boiling from 83° to 436° F., having a bromine number of 132 and an average molecular weight of 105) and 178 grams of anhydrous hydrogen fluoride were charged to a steel autoclave of 850 cc. capacity and therein stirred and heated at a temperature of 90–95° C. for a time of one hour. The resultant reaction product was then cooled and separated into 124 grams of an upper hydrocarbon layer containing 0.4 gram of hydrogen fluoride and 246.6 grams of a lower layer containing 169 grams of hydrogen fluoride admixed with organic material.

The upper layer after washing with water, caustic soda solution and drying weighed 114.5 grams. The lower layer after hydrolysis over ice, washing with caustic and water, and then drying yielded 65 grams of drying oil material. An additional quantity of 7.8 grams of drying oil was obtained by neutralization and ether extraction of the lower water layer resulting from the hydrolysis of the hydrogen fluoride lower layer.

The washed and dried upper layer hydrocarbon material had a bromine number of less than 0.5, a refractive index, $n_D^{20}$, of 1.4489, a specific dispersion of 117 and a specific gravity, $d_4^{20}$, of 0.7887. The organic material recovered upon hydrolysis of the hydrogen fluoride lower layer had a bromine number of 188, a maleic anhydride value of 91, a molecular weight of 360, a specific gravity, $d_4^{20}$, of 0.8751, a viscosity at 25° C. of a little less than 5 poises, a color (Gardner) of 18, a refractive index, $n_D^{20}$, of 1.4979, and a specific dispersion of 148.

In this run, conjunct polymerization was obtained with the formation of an upper layer and a lower layer. The large yield of upper layer together with the high specific dispersion of this material indicated that some aromatic hydrocarbons must have gone into the upper layer. The aromatic hydrocarbons contained in the upper layer were not present as ethyl benzene since specific dispersion of this fraction showed its absence. It is believed that polycyclic aromatics of high specific dispersion were formed from part of the charged styrene by means of polymerization and hydrogen transfer reactions.

The physical properties of the drying oil obtained upon hydrolyzing the lower layer were in general similar to the physical properties of drying oils formed from polymer gasoline alone at similar operating conditions except that the molecular weight was somewhat higher and the specific dispersion indicated the presence of aromatic constituents presumably derived from the styrene. Calculations based upon bromine number values and molecular weights show that the drying oil material contained about 4.2 double bonds per molecule and that about 2.6 of these were conjugated. In drying oil tests of the organic material recovered from the lower layer, it was found that a good drying oil film formed from this product, dried hard in five days but became somewhat brittle after twenty-six days of exposure.

Example II

In a run similar to that referred to in Example I, 26 grams of inden and 185 grams of the polymer gasoline were contacted with 184 grams of substantially anhydrous hydrogen fluoride at a temperature of 90–95° C. during a time of one hour. The resultant reaction mixture was then cooled and separated into 108 grams of an upper layer and 263 grams of a lower hydrogen fluoride layer. The upper layer after being washed with water and caustic soda solution followed by drying weighed 86.5 grams.

The lower hydrogen fluoride layer after hydrolysis over ice, followed by caustic washing, water washing, and drying of the resultant organic layer, yielded 104 grams of a drying oil material and 3.2 grams of similiar material recovered by neutralization and ether extraction of the water layer formed during the hydrolysis.

The washed and dried upper hydrocarbon layer had a bromine number of 3, an index of refraction, $n_D^{20}$, of 1.4497, a specific dispersion of 119, and a specific gravity, $d_4^{20}$, of 0.8021.

The drying oil material recovered from the lower layer had a bromine number of 157, a maleic anhydride value of 79, a molecular weight of 268, a specific gravity, $d_4^{20}$, of 0.8849, and viscosity at 25° C. of a littles less than 5 poises, a color (Gardner) greater than 18, a refractive index, $n_D^{20}$, of 1.5015. The specific dispersion was not obtainable because of the dark color of the oil.

The physical measurements on the upper layer hydrocarbon mixture and organic product recovered by hydrolysis of the lower layer gave indications that the inden had become incorporated into both products. The high index of refraction of the conjunct polymer was evidence of the presence of inden-containing polymers. Infrared absorption analysis of the product showed the absence of inden itself but the presence of 10–15% of aromatic ring compounds. This amount, however, is sufficient to account for only about 50% of the inden added. As noted above, the upper layer has a specific dispersion of 119 and a bromine number of only 3, thus giving evidence of the presence of appreciable amounts of aromatic compounds, possibly indan.

The yield of drying oil materials or conjunct polymers was 49% of the total organic material charged. This yield of polymers was relatively high in comparison with the yields of 35–40% generally obtained when treating polymer gasoline alone with liquid hydrogen fluoride. The higher yield of conjunct polymer was probably the result of both the co-polymerization of olefin-inden mixtures and the action of some of the inden as a hydrogen acceptor allowing more conjunct polymerization of the aliphatic monomers. A drying test on the resultant drying oil product gave a film which dried slowly and became somewhat brittle after 35 days of exposure.

Example III

The stirred steel autoclave employed in the previous examples was charged with 29 grams of divinyl benzene, 185 grams of the polymer gasoline, and 185 grams of anhydrous hydrogen fluoride. The charged autoclave was then stirred and heated at a temperature of 90–95° C. for one hour at a maximum pressure of 125 pounds per square inch. The resultant reaction product was then cooled and extracted with pentane to separate substantially saturated upper layer hydrocarbons from the hydrogen fluoride layer containing dissolved organic material. Hydrolysis of the lower layer followed by water washing, and drying, resulted in the separation of 73 grams of drying oil product.

The hydrocarbon upper layer had a bromine number of 0.5, a refractive index, $n_D^{20}$, of 1.4446, a specific dispersion of 116.5 and a specific gravity, $d_4^{20}$, of 0.7922. The drying oil recovered from the lower layer had a bromine number of 149, a maleic anhydride value of 76, a molecular weight of 246, a specific gravity, $d_4^{20}$, of 0.8862, a color (Gardner) of 18 and a viscosity of 25° C. of a little less than 5 poises. This drying oil contained 43% of material boiling above 340° C. A film of the total drying oil containing no added drier, formed a dry film which was somewhat brittle after 34 days.

We claim as our invention:

1. A process for producing a drying oil which comprises reacting an olefinic hydrocarbon having at least three carbon atoms per molecule with an unsaturated organic polar compound having the general formula R—Ar—Q wherein Ar represents an aromatic hydrocarbon radical, R represents an alkenyl group, and Q represents a member of the group consisting of a hydrogen atom, an alkyl group, an alkenyl group, a carboxylic acid group, a sulfonic acid group, and a halogen atom at a temperature of from about 0° to about 175° C. and in the presence of a hydrofluoric acid catalyst containing a major proportion by weight of hydrogen fluoride until a reaction mixture comprising substantially saturated hydrocarbons and polyunsaturated organic compounds is formed, separating the reaction mixture into a hydrofluoric acid phase and a hydrocarbon phase, separating a substantially saturated hydrocarbon product from the hydrocarbon phase, and recovering from the hydrofluoric acid phase a drying oil having more carbon atoms per molecule than the olefinic hydrocarbon charged.

2. A process for producing a drying oil which comprises reacting an olefinic hydrocarbon having at least three carbon atoms per molecule with an unsaturated organic polar compound having the general formula R—Ar—Q wherein Ar represents an aromatic hydrocarbon radical, R represents an alkenyl group, and Q represents a member of the group consisting of a hydrogen atom, an alkyl group, an alkenyl group, a carboxylic acid group, a sulfonic acid group, and a halogen atom, at a temperature of from about 0° to about 175° C. and in the presence of hydrofluoric acid of less than about 10 weight per cent water content until a reaction mixture comprising substantially saturated hydrocarbons and polyunsaturated organic compounds is formed, separating the reaction mixture into a hydrofluoric acid phase and a hydrocarbon phase, separating a substantially saturated hydrocarbon product from the hydrocarbon phase, and recovering from the hydrofluoric acid phase a drying oil having more carbon atoms per molecule than the olefinic hydrocarbon charged.

3. A process for converting an olefinic hydrocarbon having at least three carbon atoms per molecule and an unsaturated organic polar compound having the general formula R—Ar—Q wherein Ar represents an aromatic hydrocarbon radical, R represents an alkenyl group, and Q represents a member of the group consisting of a hydrogen atom, an alkyl group, an alkenyl group, a carboxylic acid group, a sulfonic acid group, and a halogen atom, to produce a saturated hydrocarbon product and a drying oil which comprises contacting said olefinic hydrocarbon and unsaturated organic polar compound at a temperature of from about 0° to about 175° C. with hydrofluoric acid of less than about 10 weight per cent of water content; correlating the amount of hydrofluoric acid, the reaction temperature, and time to effect polymerization and condensation reactions of said olefinic hydrocarbon and said unsaturated organic compound and to permit hydrogen exchange to occur between the polymers and condensation products to form substantially saturated hydrocarbon material and a drying oil; separating the reaction mixture into a hydrofluoric acid phase and a hydrocarbon phase; recovering from the hydrocarbon phase a substantially saturated hydrocarbon product having more carbon atoms per molecule than the charged olefinic hydrocarbon and recovering a drying oil from the hydrofluoric acid phase.

4. The process defined in claim 3 further characterized in that the charged olefinic hydrocarbon comprises a butylene.

5. The process defined in claim 3 further characterized in that the charged olefinic hydrocarbon contains from about 5 to about 12 carbon atoms per molecule.

6. A process for producing a drying oil which comprises reacting a monoolefin having at least three carbon atoms per molecule with an unsaturated organic polar compound having the general formula R—Ar—Q wherein Ar represents an aromatic hydrocarbon group, R represents an alkenyl group and Q represents a member of the group consisting of a hydrogen atom, an alkyl group, an alkenyl group, a carboxylic acid group, a sulfonic acid group, and a halogen atom, at a temperature of from about 0° to about 175° C. in the presence of hydrofluoric acid of from about 90 to about 100% hydrogen fluoride concentration until substantially saturated hydrocarbons and a drying oil comprising polyunsaturated organic compounds containing more carbon atoms per molecule than said monoolefin charge stock are formed, separating the reaction mixture into a hydrofluoric acid phase, and a hydrocarbon phase, recovering the substantially saturated hydrocarbons from the hydrocarbon phase, and separating a drying oil comprising polyunsaturated organic compounds from the hydrofluoric acid phase.

7. A process for producing a drying oil which comprises reacting a monoolefin having at least three carbon atoms per molecule with an unsaturated organic polar compound having the general formula R—Ar—Q wherein Ar represents an aromatic hydrocarbon group, R represents an alkenyl group, and Q represents a member of the group consisting of a hydrogen atom, an alkyl group, an alkenyl group, a carboxylic acid group, a sulfonic acid group, and a halogen atom, at a temperature of from about 0° to about 175° C. and at a pressure of from about 1 to about 100 atmospheres in the presence of hydrofluoric acid of from about 90 to about 100% hydrogen fluoride concentration until substantially saturated hydrocarbons and a drying oil comprising polyunsaturated organic compounds containing more carbon atoms per molecule than said monoolefin charge stock are formed, separating the reaction mixture into a hydrofluoric acid phase and a hydrocarbon phase, recovering the substantially saturated hydrocarbons from the hydrocarbon phase, and separating a drying oil comprising polyunsaturated organic compounds from the hydrofluoric acid phase.

8. A process for producing a drying oil which comprises reacting a normally liquid monoolefin with an unsaturated organic polar compound having the general formula R—Ar—Q wherein Ar represents an aromatic hydrocarbon group, R represents an alkenyl group, and Q represents a member of the group consisting of a hydrogen atom, an alkyl group, an alkenyl group, a carboxylic acid group, a sulfonic acid group, and a halogen atom, at a temperature of from about 0° to about 175° C. and at a pressure of from about 1 to about 100 atmospheres in the presence of hydrofluoric acid of from about 90 to about 100% hydrogen fluoride concentration until substantially saturated hydrocarbons and a drying oil comprising polyunsaturated organic compounds containing more carbon atoms per molecule than said monoolefin charge stock are formed, separating the reaction mixture into a hydrofluoric acid phase and a hydrocarbon phase, recovering the substantially saturated hydrocarbons from the hydrocarbon phase, and separating a drying oil comprising polyunsaturated organic compounds from the hydrofluoric acid phase.

9. The process defined in claim 8 further characterized in that the normally liquid monoolefin contains from about 5 to about 12 carbon atoms per molecule.

10. A process for producing a drying oil which comprises mixing from about 0.1 to about 10 parts by weight of hydrofluoric acid of from about 90 to about 100% by weight hydrogen fluoride concentration and one part by weight of a mixture of from about 1 to about 50 molar proportions of an olefinic hydrocarbon having at least three carbon atoms per molecule and one molar proportion of an unsaturated organic polar compound having the general formula R—Ar—Q wherein Ar represents an aromatic hydrocarbon group, R represents an alkenyl group, and Q represents a member of the group consisting of a hydrogen atom, an alkyl group, an alkenyl group, a carboxylic acid group, a sulfonic acid group, and a halogen atom, at a temperature of from about 0° to about 175° C., agitating the reaction mixture for a time sufficient to form polymerization and condensation products and to effect hydrogen exchange to form a substantially saturated hydrocarbon material and a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

11. A process for producing a drying oil which comprises mixing from about 0.1 to about 10 parts by weight of hydrofluoric acid of from about 90 to about 100% by weight hydrogen fluoride concentration and one part by weight of a mixture of from about 1 to about 50 molar proportions of a butylene and one molar proportion of an unsaturated organic polar compound having the general formula R—Ar—Q wherein Ar represents an aromatic hydrocarbon group, R represents an alkenyl group, and Q represents a member of the group consisting of a hydrogen atom, an alkyl group, an alkenyl group, a carboxylic acid group, a sulfonic acid group, and a halogen atom at a temperature of from about 0° to about 175° C., agitating the reaction mixture for a time sufficient to form polymerization and condensation products and to effect hydrogen exchange to form a substantially saturated hydrocarbon material and a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

12. A process for producing a drying oil which comprises mixing from about 0.1 to about 10 parts by weight of hydrofluoric acid of from about 90 to about 100% by weight hydrogen fluoride concentration and one part by weight of a mixture of from about 1 to about 50 molar proportions of a normally liquid olefin and one molar proportion of an unsaturated organic polar compound having the general formula R—Ar—Q wherein Ar represents an aromatic hydrocarbon group, R represents an alkenyl group, and Q represents a member of the group consisting of a hydrogen atom, an alkyl group, an alkenyl group, a carboxylic acid group, a sulfonic acid group, and a halogen atom at a temperature of from about 0° to about 175° C., agitating the reaction mixture for a time sufficient to form polymerization and condensation products and to effect hydrogen exchange to form a substantially saturated hydrocarbon material and a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

13. A process for producing a drying oil which comprises mixing from about 0.1 to about 10 parts by weight of hydrofluoric acid of from about 90 to about 100% by weight hydrogen fluoride concentration and one part by weight of a mixture of from about 1 to about 50 molar proportions of a normally liquid olefin and one molar proportion of an alkenyl aromatic hydrocarbon at a temperature of from about 0° to about 175° C., agitating the reaction mixture for a time sufficient to form polymerization and condensation products and to effect hydrogen exchange to form a substantially saturated hydrocarbon material and a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

14. A process for producing a drying oil which comprises mixing from about 0.1 to about 10 parts by weight of hydrofluoric acid of from about 90 to about 100% by weight hydrogen fluoride concentration and one part by weight of a mixture of from about 1 to about 50 molar proportions of a normally liquid olefin and one molar proportion of a benzene hydrocarbon having at least one vinyl group at a temperature of from about 0° to about 175° C., agitating the reaction mixture for a time sufficient to form polymerization and condensation products and to effect hydrogen exchange to form a substantially saturated hydrocarbon material and a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

15. A process for producing a drying oil which comprises mixing from about 0.1 to about 10 parts by weight of hydrofluoric acid of from about 90 to about 100% by weight hydrogen fluoride concentration and one part by weight of a mixture of from about 1 to about 50 molar proportions of a normally liquid olefin and one molar proportion of styrene at a temperature of from about 0° to about 175° C., agitating the reaction mixture for a time sufficient to form polymerization and condensation products and to effect hydrogen exchange to form a substantially saturated hydrocarbon material and a poly-unsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

16. A process for producing a drying oil which comprises mixing from about 0.1 to about 10 parts by weight of hydrofluoric acid of from about 90 to about 100% by weight of hydrogen fluoride concentration and one part by weight of a mixture of from about 1 to about 50 molar proportions of a normally liquid olefin and one molar proportion of inden at a temperature of from about 0° to about 175° C., agitating the reaction mixture for a time sufficient to form polymerization and condensation products and to effect hydrogen exchange to form a substantially saturated hydrocarbon material and a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

HERMAN S. BLOCH.
RICHARD C. WACKHER.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,301,668 | Pier et al. | Nov. 10, 1942 |
| 2,400,521 | Kuhn, Jr. | May 21, 1946 |
| 2,413,310 | Bloch | Dec. 31, 1946 |
| 2,440,477 | Johnstone | Apr. 27, 1948 |
| 2,442,644 | Elwell et al. | June 1, 1948 |